Patented Nov. 15, 1927.

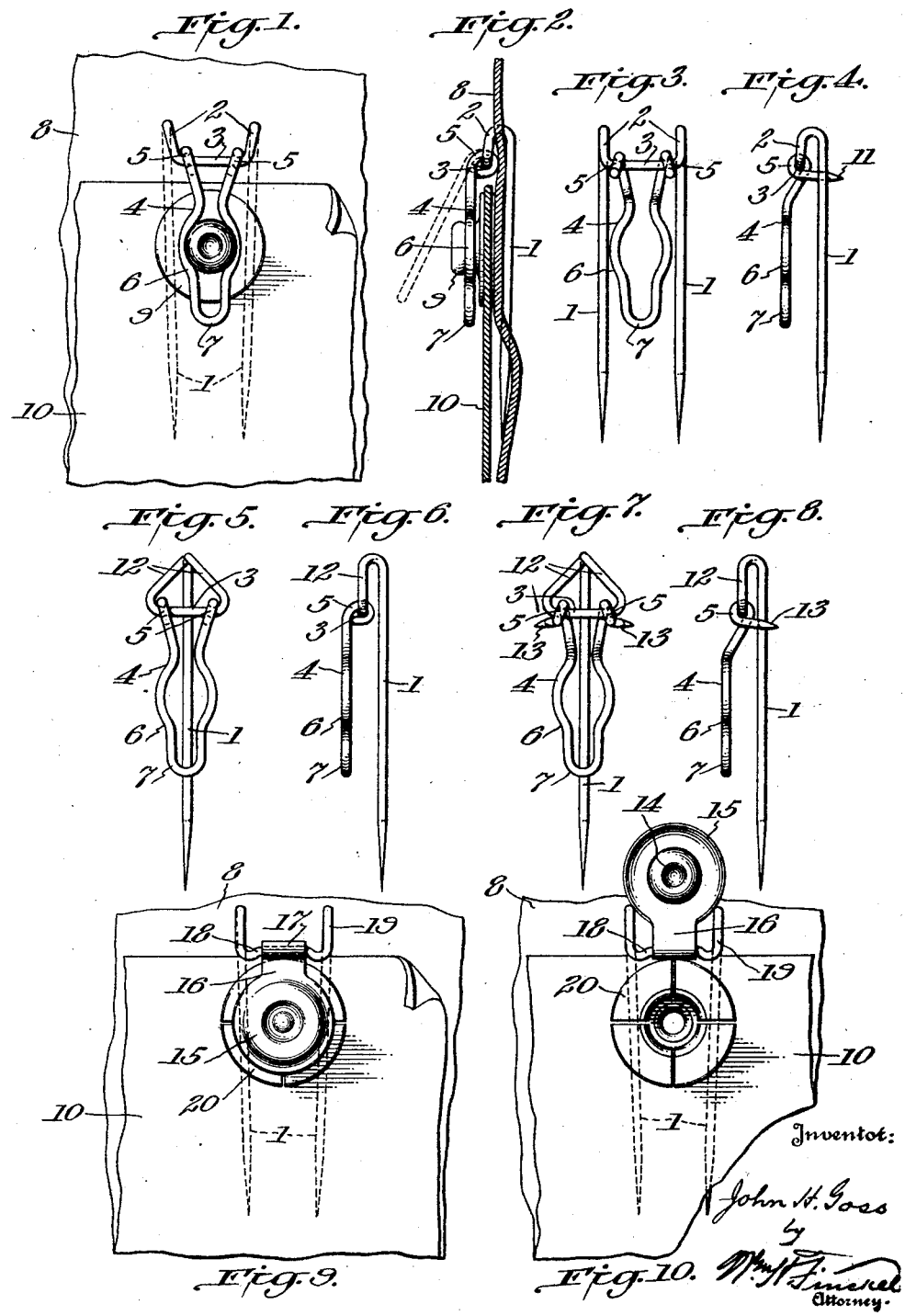

1,649,768

UNITED STATES PATENT OFFICE.

JOHN H. GOSS, OF WATERBURY, CONNECTICUT, ASSIGNOR TO SCOVILL MANUFACTURING COMPANY, OF WATERBURY, CONNECTICUT, A CORPORATION OF CONNECTICUT.

PIN-HINGE SNAP FASTENER.

Application filed May 19, 1927. Serial No. 192,570.

This invention consists of a pin fastener of the snap-fastener type, in which either the socket member or the head or stud member is hingedly connected with the pin, so that either member may be engaged with or disengaged from its mate by pivotal movement on the pin, as I will proceed now more particularly to explain and finally claim.

It will be understood that when the socket member is pivoted upon the pin, the complemental stud member will be fixedly secured to the part to be attached, and that when the stud member is pivoted upon the pin, the mating socket member will be fixedly secured to the part to be attached.

When used for securing covers to upholstered bodies, as in the upholstered parts of automobiles, the fixed members will be attached to the covers and the pin members will be stuck in the upholstered parts, so as to register correctly with the fixed members, whereby the fixed members may be engaged with the pin members to hold the cover in place.

In the accompanying drawings illustrating the invention, in the several figures of which like parts are similarly designated, Figure 1 is a front elevation, and Fig. 2 is a sectional elevation illustrating one form of the invention in which the socket member is the hinged member, the parts being indicated as mounted substantially as they will appear in use. Fig. 3 is a front elevation and Fig. 4 is a side elevation of a modified form of the device. Fig. 5 is a front elevation and Fig. 6 is a side elevation showing the invention embodied in a single pin fastener. Fig. 7 is a front elevation and Fig. 8 is a side elevation illustrating a modification of the single pin structure shown in Figs. 5 and 6. Fig. 9 is a plan view with the parts mounted as they would be in use, and showing the stud member hinged to the pin and the socket member fixed to one of the parts to be secured. Fig. 10 is a view similar to Fig. 9 but with the stud disengaged from the socket.

As shown in Figs. 1, 2, 3 and 4, there is a double-pointed pin 1, having the upper portions of its limbs bent over to form a loop 2 having the cross piece 3; the loop being spaced apart from the limbs as indicated in Figs. 2 and 4.

To this cross piece 3 is hingedly applied either the socket member or the stud member of a snap fastener; and in the instances shown in Figs. 1, 2 and Figs. 3, 4, the member is the socket member 4. This socket member is shown as a loop of spring wire, having the eyes 5 by which it is hingedly connected to the cross piece 3 and having its limbs bowed or curved outwardly, as shown at 6, to form a stud-engaging element, and thence extended into a fingerhold 7. In other words, the socket member is a piece of resilient wire bent upon itself and one end closed and the hinging eyes at the free ends closed and the intermediate portions bowed outwardly to form the stud-engaging elements. Obviously, the elasticity of the wire thus shaped is availed of to make a secure connection with the stud. In practice the pin will be stuck into the upholstery 8, for example, the upholstered automobile body, while any suitable complementary or mating snap fastener element 9, is fixedly secured to a cover 10 which is to be detachably applied to the upholstered portion.

Inasmuch as the strain on the pin is in the direction of its points, it is obvious that the engagement of the pin with the upholstery in the loop will afford a very secure mounting for the pin.

The spread of the member 4 is limited by its hinging ends coming into contact with the ends of the cross piece 3 of the pin.

The engagement of the member 4 with the member 9, is effected by moving member 4 from the dotted line position, Fig. 2, into the full line position, same figure, and the separation or disengagement of member 4 with the member 9 is effected by moving said member 4 from the full line position to the dotted line position, Fig. 2.

In Figs. 3 and 4, the member 4 has the material of its hinging eyes extended rearwardly toward the limbs of the pin and pointed, at 11, and these pointed terminals are utilized to pierce the upholstery and thus afford an additional hold to retain the pin in position.

The invention may be applied to a single limb pin, as shown in Figs. 5, 6, 7 and 8, wherein instead of making the loop end of the pin as in Figs. 1 to 4, it may be made of substantially triangular form, as at 12. As shown in Figs. 7 and 8, the hinging eyes of the snap fastener element may have their ends extended rearwardly and pointed, and slightly spread apart as at 13, where they cross the limbs of the member 4 for the same purpose as that described in connection with the form shown in Figs. 3 and 4.

As shown in Figs. 9 and 10, instead of using the hinged member as a socket member, the hinged member may be the stud member; and as shown in Figs. 9 and 10, this stud member has the head 14 struck up from a body 15 and provided with a shank 16 which is hinged at 17 to a cross piece 18 of the looped end 19 of the pin so as to swing freely thereon. The looped end 18 may be bent as shown in Figs. 9 and 10 so as to present stops on either side to prevent undue lateral movement of the stud member hinged thereto. 20 indicates a substantially common form of resilient socket member which, in this instance, is secured to the cover 10.

If desired, the socket members shown in Figs. 1 to 8 may be provided with an ornamental cap, as may be the stud member shown in Figs. 9 and 10; any desired finish of such ornamental cap being used.

Where the hinged member is provided with the points 11 or 13, these points aid in keeping the hinged member and pin from tipping to a sidewise strain, and this is particularly true of the single pin construction shown in Figs. 7 and 8.

Variations in details of construction are permissible within the principle of the invention and the claims following.

What I claim is:—

1. In a snap fastener, a pin having a looped head provided with a cross piece, and a snap fastener member hingedly applied to said cross piece.

2. In a snap fastener, a pin having a looped head provided with a cross piece, and a resilient loop hingedly connected with said cross piece and adapted to engage a mating member of the snap fastener.

3. In a snap fastener, a pin having a looped head provided with a cross piece, and a resilient loop hingedly connected with said cross piece and adapted to engage a mating member of the snap fastener, the hinging element of the resilient loop having its ends turned toward the pin and pointed to engage the material in which the pin is stuck.

4. In a snap fastener, a double-pointed pin having a looped head provided with a cross piece, and a snap fastener element hingedly mounted on said cross piece in substantially fixed relation to the limbs of the pin.

5. In a snap fastener, a pin having a looped head, and a stud-engaging member hingedly applied to said looped head by means of eyes thereon and having bowed portions between said eyes and the opposite end of the stud-engaging member.

6. In a snap fastener, a pin having a looped head, and a stud-engaging member hingedly applied to said looped head by means of eyes thereon and having bowed portions between said eyes and the opposite end of the stud-engaging member, the material of the eyes being extended toward the pin and pointed.

In testimony whereof I have hereunto set my hand this 18 day of May A. D. 1927.

JOHN H. GOSS.